United States Patent [19]
Matsuoka et al.

[11] Patent Number: 5,461,689
[45] Date of Patent: Oct. 24, 1995

[54] APPARATUS FOR AND METHOD OF POLISHING OPTICAL CONNECTORS

[75] Inventors: Yoshihiro Matsuoka, Chiba; Nobutoshi Takeda, Funabashi; Tohru Mizuhashi, Chiba, all of Japan

[73] Assignees: Emit Seiko Co., Ltd.; Daito Seiki Co., Ltd., both of Tokyo, Japan

[21] Appl. No.: 346,862

[22] Filed: Nov. 30, 1994

Related U.S. Application Data

[62] Division of Ser. No. 206,797, Mar. 7, 1994, Pat. No. 5,412,747.

[51] Int. Cl.$^6$ ............................... G02B 6/26; G02B 6/42
[52] U.S. Cl. .................................... 385/85; 65/495
[58] Field of Search ............................ 65/385, 376, 387, 65/495; 385/85; 451/41

[56]   References Cited

U.S. PATENT DOCUMENTS

4,802,726   2/1989   Palmquist et al. .
5,062,682   11/1991   Marazzi .
5,113,465   5/1992   Kawanami et al. ...................... 385/85
5,245,684   9/1993   Terao et al. .

*Primary Examiner*—Rodney B. Bovernick
*Assistant Examiner*—Robert E. Wise
*Attorney, Agent, or Firm*—Frishauf, Holtz, Goodman, Langer & Chick

[57]                ABSTRACT

A holding member holding an optical connector is set in a rotary member such that the optical axis of the optical connector is at a predetermined inclination angle to the axis of rotation of the rotary member. An end face of the optical connector is then brought into contact with a polishing member. Then, the rotary member and polishing member are driven for rotation by drive means to polish the end face of the optical connector into an inclined convex spherical surface.

8 Claims, 7 Drawing Sheets

APPARATUS FOR AND METHOD OF POLISHING OPTICAL CONNECTORS

This is a division of application Ser. No. 08/206,797 filed Mar. 7, 1994, now U.S. Pat. No. 5,412,747.

FIELD OF THE INVENTION AND RELATED ART STATEMENT

This invention relates to an apparatus for and a method of polishing optical connectors and, more particularly, to inclined convex spherical surface polishing of the optical connector end face.

Optical fiber cables for optical communication are required that the deviation of the connected ends of adjacent ones of them from the optical axis has to be held within several μm.

Figure 7:
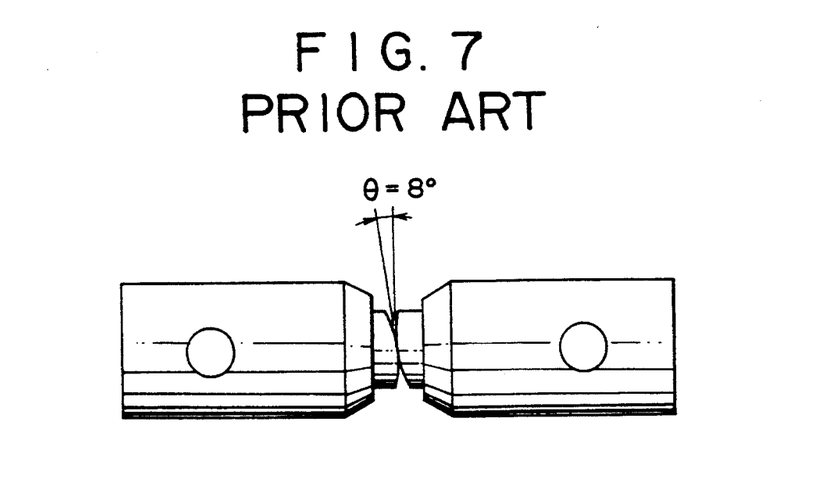
FIG. 7 is a schematic view showing prior art optical connectors having been provided with inclined convex spherical surface polishing.

Accordingly, a connector is fitted on each optical fiber cable end. The opposed optical fiber cable ends are polished and elastically abuttedly connected to each other. Particularly, ferrules are used, and their end face is machined into a convex spherical surface, whereby adjacent fibers can be connected directly, thus permitting suppression of the connection loss and attenuation by reflection. Recently, in place of the prior art method of polishing the ferrule end face into a convex spherical shape with respect to a perpendicular end face, a technique has been developed, in which the ferrule end face is polished into an inclined convex spherical shape. FIG. 7 shows the prior art method of polishing. In this case, the ferrule end face is polished into an inclined convex spherical surface at an angle θ of 8° to it. This method, compared to the perpendicular convex spherical surface polishing, permits reduction of the reflected return light from the optical fiber end face by 50% or more. Thus, when adjacent optical fibers are connected, there is less transmission noise therein. This method thus is suited for connection in CATV or image transmission lines.

Figure 8A:
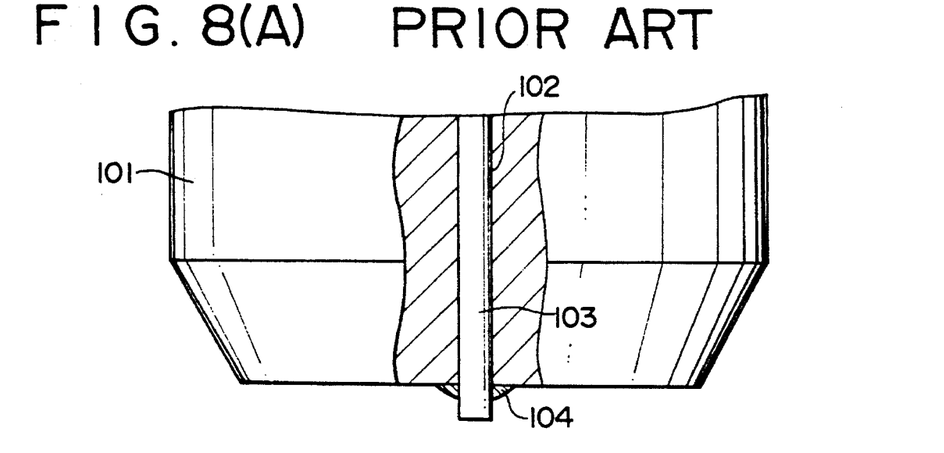
FIGS. 8(A) to 8(C) are schematic views for explaining a problem in the prior art inclined convex spherical surface polishing.
Figure 8B:
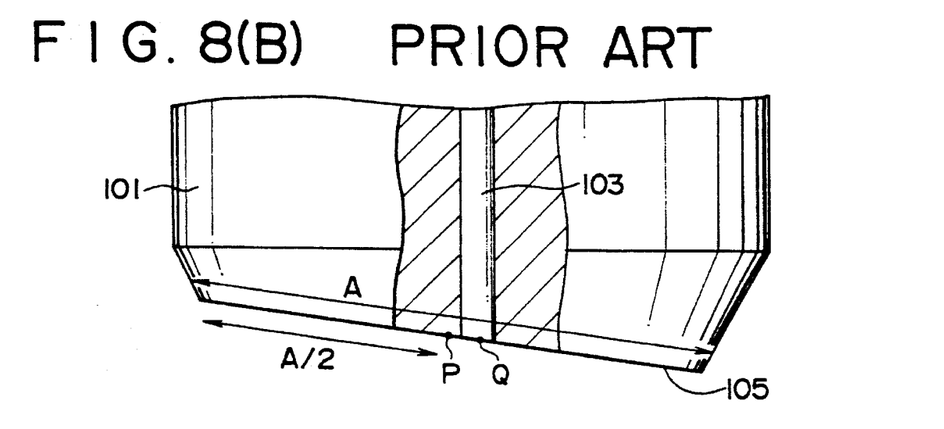
Figure 8C:
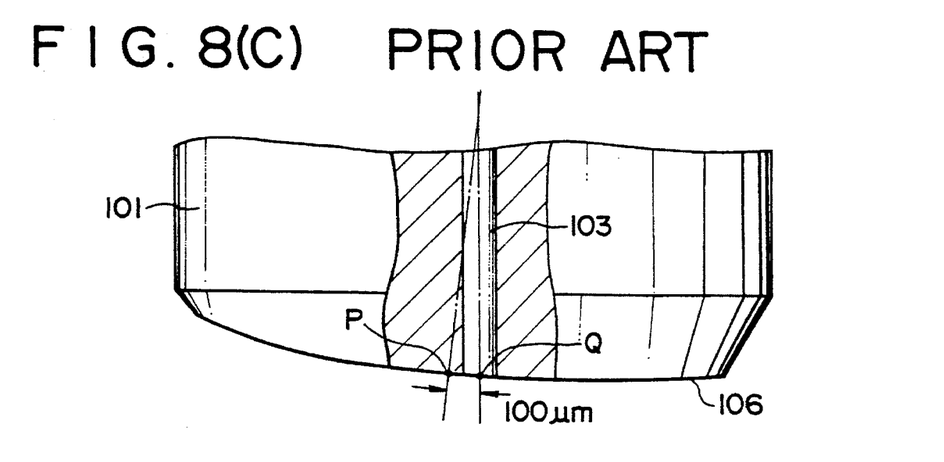

However, the prior art inclined polishing process has a problem that it is difficult to keep the excentricity of the radius of curvature of the convex spherical surface within a predetermined permissible range. This will be described briefly with reference to FIGS. 8(A) to 8(C). FIG. 8(A) shows the shape of the connector end face before the polishing. An optical fiber 103 is inserted in a center bore 102 of a ferrule 101, and it is secured thereto by adhesive 104. The ferrule 101 has a predetermined end taper which is formed for facilitating the operation of connection. Then, as shown in FIG. 8(B), the end face of the ferrule 101 is ground into an inclined plane surface at a predetermined angle. Since the the ferrule preliminarily has the tapered end, the center position P of the inclined plane ground surface 105 is deviated from the center position Q of the optical fiber 103. As is obvious from the Figure, the center position P is at a distance of A/2 from the edge of the inclined plane ground surface 105 where A is the diametrical dimension of the ground surface 105. This center position P is deviated from the center position Q of the optical fiber 103. Then, as shown in FIG. 8(C), the inclined plane ground surface 105 is polished into an inclined convex spherical surface 106. As is obvious from the Figure, the adex of the convex spherical surface 106 coincides with the center position P of the inclined plane ground surface noted above. Thus, the convex spherical surface 106 has an excentricity with respect to the center position Q of the optical fiber. The excentricity extent reaches about 100 μm. The permissible excentricity of the radius of curvature is set to 50 μm, for instance. Therefore, the excentricity of 100 μm extremely increases the connection loss, which is a problem to be solved.

Meanwhile, in order to suppress the excentricity of the radius of curvature in such inclined convex spherical surface polishing, connectors having special ferrule end face shapes have been developed. For example, in the example of FIG. 7 noted before, the tapered ferrule end has a reduced diameter projection for joining. In this case, the ferrule end face is provided with inclined convex spherical surface polishing on the projection for joining, thus precluding the excentricity of the radius of curvature.

However, the end face of the ferrule shown in FIG. 7 is machined into a very special shape, which is quite different from the shape of a general purpose article as shown in FIG. 10. Adopting such a special shape is disadvantageous in view of the price and versatility of part and therefore can not be a practical measure of solving the problem.

OBJECT AND SUMMARY OF THE INVENTION

The invention has been intended in view of the above problems that have been inherent in the prior art, and its object is to provide an apparatus for and a method of polishing the optical connector end face, which permits inclined convex spherical surface polishing with a small excentricity of the radius of curvature compared to the general purpose connector.

To attain the above object of the invention, there is provided an apparatus for polishing optical connectors, which comprises:

an optical connector support section including a holding member for holding an optical connector mounted therein and a rotary member rotatable about a predetermined axis of rotation;

the holding member being disposed in the rotary member such that the optical axis of the optical connector is at a predetermined angle to the axis of rotation of the rotary member;

a polishing member section to be in contact with an end face of the optical connector for polishing the end face to a predetermined shape;

first drive means for rotating the optical connector support section; and second drive means for rotating the polishing member section.

According to the invention, there is further provided an apparatus for polishing optical connectors, which further comprises adjusting means for adjusting the position of securement of the optical connector such that the point of the optical axis of the optical connector in the end face thereof coincides with the axis of rotation.

The adjusting means includes thread means able to cause advancement and retreat of the holding member in the optical axis direction or thread means able to cause movement of the holding member in a plane at right angles to the axis of rotation.

Further, according to the invention, there is provided an apparatus for polishing optical connectors, in which the angle of inclination of the optical axis is 8° to 12°, or in which the polishing member section includes an elastic polishing member.

Further, according to the invention, there is provided a method of polishing optical connectors, which comprises the steps of:

causing the optical axis of an optical connector to be at a predetermined angle to a predetermined axis of rotation and also causing the point of the optical axis in an end face of the optical connector to coincide with the axis of rotation; and bringing the end face of the inclined optical connector into forced contact with the polishing member while causing rotation of the end face about the axis of rotation.

Further, in this method according to the invention, an optical connector, of which the point of optical axis if held to be coincident with the axis of rotation, is prepared in advance and then set in the polishing apparatus.

According to the invention, the optical connector is held such that the optical axis thereof is at an angle to the axis of rotation. Thus, the optical connector end face is at a predetermined angle with respect to the axis of rotation. When the optical connector is polished by rotating it in this state, a desired inclined convex spherical surface can be obtained. Particularly, the center of the machined surface of the ferrule is set such as to obtain coindidence of the optical axis point and axis of rotation with each other. Thus, the optical connector undergoes an oscillating motion about the axis of rotation with the optical axis point as a support point. The apex of the inclined convex spherical surface thus obtained by the polishing, coincides with the optical axis point, and thus the excentricity of the radius of curvature of the convex spherical surface is substantially zero. In practice, however, a slight excentricity of the radius of curvature appears due to a positioning error, but it can be controlled to be sufficiently within the permissible range. Thus, according to the invention the reduction of reflected return light is realized while maintaining very low insertion loss. The optical connector produced according to the invention is thus subject to low noise and suitably applicable to CAVT or image transmission channel jumper cables.

BREIF DESCRIPTION OF THE DRAWINGS

These and other objects, features and advantages of the invention will become more apparent upon a reading of the following detailed specification and drawings, in which.

DETAILED DESCRIPTION OF THE PREFERRED EMBODIMENTS

Figure 1:
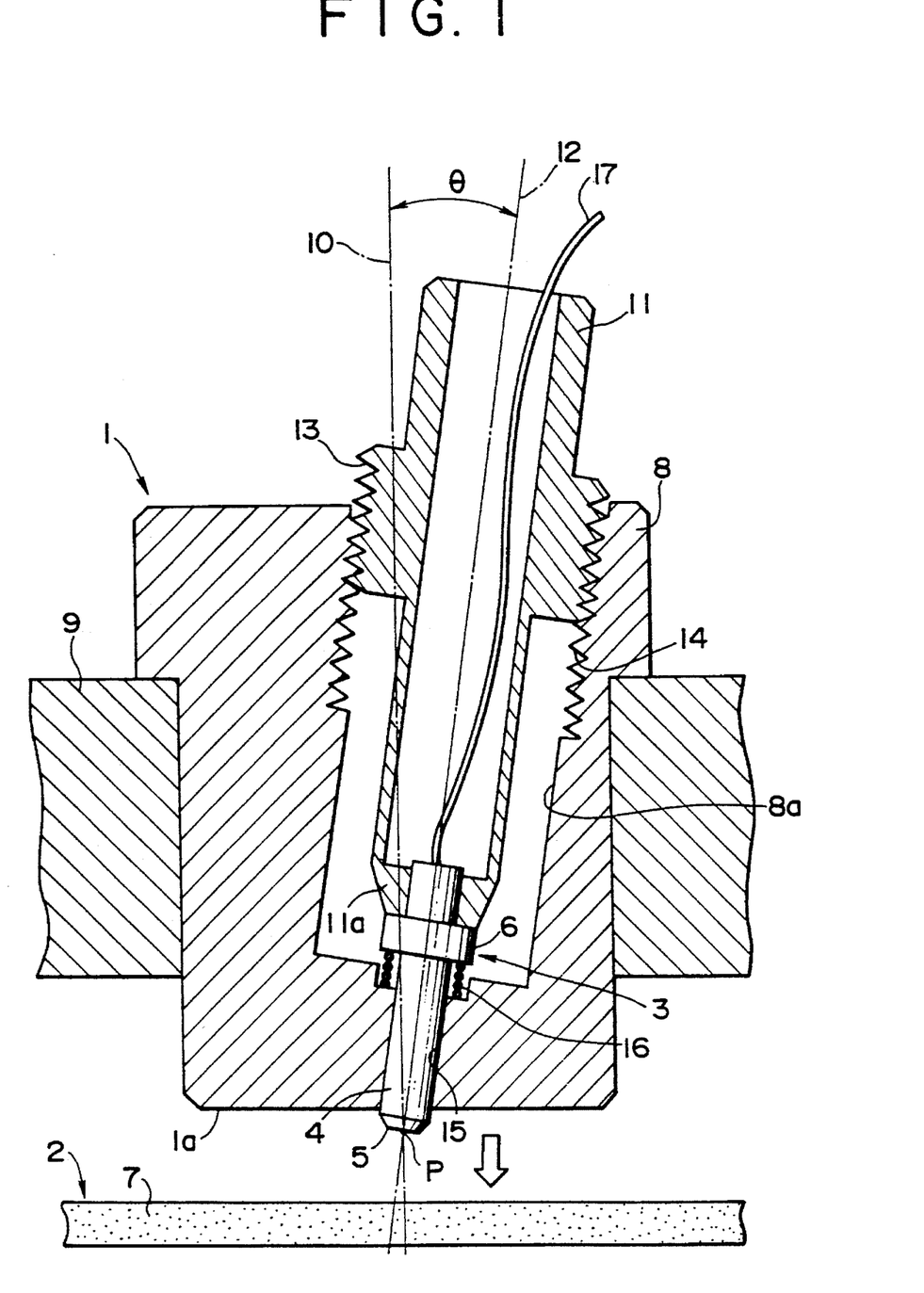
FIG. 1 is a fragmentary sectional view showing an essential part of a first embodiment of the apparatus for optical connector end face polishing according to the invention.

Preferred embodiments of the invention will now be described in detail with reference to the drawings. FIG. is a fragmentary sectional view showing an essential part of the first embodiment of the optical connector end face polishing apparatus according to the invention. The illustrated optical connector end face polishing apparatus comprises an optical connector support section 1 and a polishing member section 2. The optical connector support section 1 rotatably supports an optical connector 3 to be polished. The optical connector 3 comprises a ferrule 4 having a central axial bore with an optical fiber 17 inserted therein. The ferrule 4 has a general shape. It has a tapered end 5 and a flange 6 provided at an axially intermediate position. The polishing member section 2, on the other hand, includes a polishing member 7 which can be rotated or revolved. The end face 5 of the ferrule 4 projects from the lower surface of the optical connector support section 1 and is to be held in contact with the polishing member 7 for its inclined convex spherical surface polishing. The polishing member 7 is capable of elastic deformation, and when it is in forced contact with the end face 5 of the ferrule 4, it is curved concave-wise, so that desired spherical surface polishing is obtainable. It is possible as well to make the polishing member 4 of a hard material.

The optical connector support section 1 includes a rotary member 8 and a support block 9. The rotary member 8 is assembled in the support block 9. The rotary member 8 has a substantially cylindrical shape and is rotatable about a vertical axis 10 of rotation by a drive mechanism (not shown). A bearing (not shown) is interposed between the rotary member 8 and the support block 9. A holding member 11 is screwedly assembled in the rotary member 8. The holding member 11 holds and guides the optical connector 3 such that the optical axis 12 thereof is at a predetermined inclination angle θ to the axis 10 of rotation. The optical axis 12 coincides with the axis of the central bore of the ferrule 4 noted above. The holding member 11 has a substantially cylindrical shape having an open end portion 11a. The ferrule 4 is held with its flange 6 in contact with the open end portion 11a. The flange 6 has a notch (not shown), in which an external pin is engaged to prevent rotation of the ferrule 4. The holding member 11 is assembled adjustably such that it can be advanced and retreated in the direction of the optical axis 12. More specifically, an adjusting means is formed by a male and a female thread 13 and 14 screwed together, the male thread 13 being formed in the outer periphery of the holding member 11, the female thread 14 being formed in the inner periphery 8a of the hollow rotary member 8. The optical connector 3 can be positioned by the adjusting means. More specifically, by turning the upper portion of the holding member 11, the ferrule 4 can be advanced and retreated vertically along the optical axis 12 toward and away from the polishing member 7. The rotary member 8 is formed in its end portion with a guide hole 15, in which is inserted the ferrule 4 supported by the holding member 11. A coil spring 16 is inserted between the edge about the upper end of the guide hole 15 and the flange 6 of the ferrule 4 and is biasing the ferrule 4 rearward along the optical axis 12. The holding member 11 thus can be advanced and retreated in the direction of the optical axis 12 to secure the optical connector 3 in position such that the point P of the optical axis at the center of the end face 5 of the ferrule 4 is at a predetermined inclination angle θ to the axis of rotation. The optical axis point P represents the position, at which the center of the end face 5 of the ferrule 4 and the optical axis 12 intersect with each other. Thus, when the optical axis point P is made coincident with the axis 10 of rotation, the optical axis 12 and axis 10 of rotation intersect at the center of the end face 12.

A method of optical connector end face polishing according to the invention will now be described with reference to FIG. 1. In a first step, the optical connector 3 is set in the optical connector support section 1 such that its optical axis 12 is at a predetermined angle 8 to the axis 10 of rotation. More specifically, the optical connector 3 is set in the holding member 11, which is then assembled in the rotary member 8. In a second step, the optical connector 3 is adjusted in position by causing advancement and retreat of the holding member 11 carrying it set therein in the direction of its optical axis through the screwed coupling of the threads 13 and 14, and the optical connector 3 is secured in position such that the optical axis point P at the center of the end face 15 is in the axis 10 of rotation. In a third or last step, the optical connector 3 is caused to undergo oscillating rotation about the axis 10 of rotation, thus performing inclined convex spherical surface polishing with the inclined end face 5 in forced contact with the polishing member 7.

Figure 2:
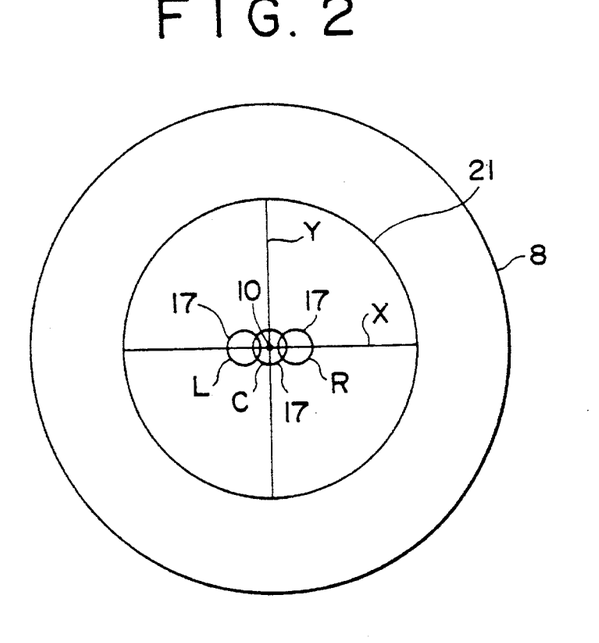
FIG. 2 is a schematic view for explaining a positioning operation in a method of optical connector end face polishing according to the invention.

Now, the above method of adjustment by causing advancement and retreat of the holding member 11 in the direction of the optical axis 12 will be described with reference to FIG. 2. In this example, a microscope is used for the adjusting operation. The support block 9, with the optical connector 3 set therein, is set under the microscope such that the bottom of the rotary member 8 can be observed. In the microscope field 21, perpendicular hair lines X and Y are displayed. The support block 9 is set in the microscope such that the hair line intersection coincides with the axis 10 of rotation of the rotary member 8. In the Figure, the axis 10 of rotation is perpendicular to the plane of the paper. In the microscope field 21 is further displayed a section of the optical fiber 17 exposed in the ferrule end face. In the illustrated example, the optical axis 12 of the optical connector is inclined in the X direction with respect to the axis 10 of rotation. That is, the section of the optical fiber 17 appears at different positions on the line X depending on the position of the optical connector in the optical axis direction. In the illustrated case, three states are shown. The small circle R on the right side of the hair line intersection represents a case when the optical connector is retreated in the optical axis direction. The left side small circle L represents a case when the optical connector is excessively projected in the optical axis direction. The central small circle C represents a case when the adjustment is completed. In this case, the center point at the end of the optical fiber 17 is accurately aligned to the axis 10 of rotation. In the above way, according to the invention the adjusting operation for positioning the optical connector can be readily carried out by using a microscope.

Figure 3:
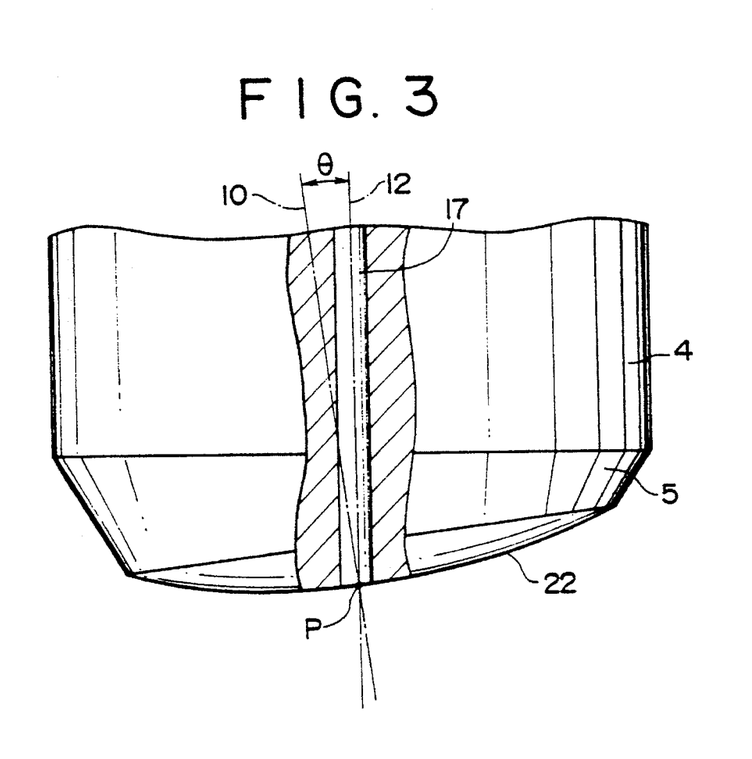
FIG. 3 is a fragmentary enlarged-scale view showing the shape of an optical connector end face machined according to the invention.

FIG. 3 is a schematic view showing the shape of optical connector end after inclined convex spherical surface polishing thereof. According to the invention, the inclined convex spherical surface 22 is obtained by polishing carried out in such a state that the optical axis point P at the end face 5 of the ferrule 4 is in the axis 10 of rotation. This inclined convex spherical surface 22 is obtained by polishing with the axis 10 of rotation as a reference and also with a predetermined radius of curvature. Its apex coincides with the optical axis point P. Thus, the excentricity of the radius of curvature of the inclined convex spherical surface 22 can be made extremely small. For example, when the radius of curvature of the convex spherical surface 22 is set to 10 to 25 mm, it is possible to hold the excentricity to be sufficiently within the permissible range of 50 μm. In addition, by adopting the inclined convex spherical surface, it is possible to ensure attenuation by reflection to be 60 dB or above and insertion loss to be 0.5 dB or below. To this end, the inclination angle ν of the optical axis 12 is suitably set in a range of 8° to 12°.

In order to let the optical axis 12 of the optical connector 3 be coincident with the axis 10 of rotation of the rotary member 8 at the optical axis point P on the optical connector end face 5, the above first embodiment of the invention has used the adjusting means, which comprises the male thread 13 formed in the outer periphery of the holding member 11 and the female thread 14 formed in the inner periphery 8a of the hollow rotary member 8. Specifically, in the above first embodiment the optical connector 3 is positioned after it has been set in the rotary member 8. This arrangement, however, is by no means limitative. For example, it is possible to prepare a separate positioning member while providing, on the side of the rotary member 8, a reference surface which corresponds to a positioning surface of the positioning member. In this case, the optical connector 3 is first set in the positioning member, and the length of extension of the optical connector end face 5 is set with the positioning surface. Then, the optical connector is removed from the positioning member and then set in the rotary member such that it is in contact with the reference surface of the rotary member. By so doing, the optical axis 12 and the axis 10 of rotation automatically coincide with each other at the optical axis point P of the optical connector end face 5, thus making any subsequent adjustment unnecessary.

Figure 4:
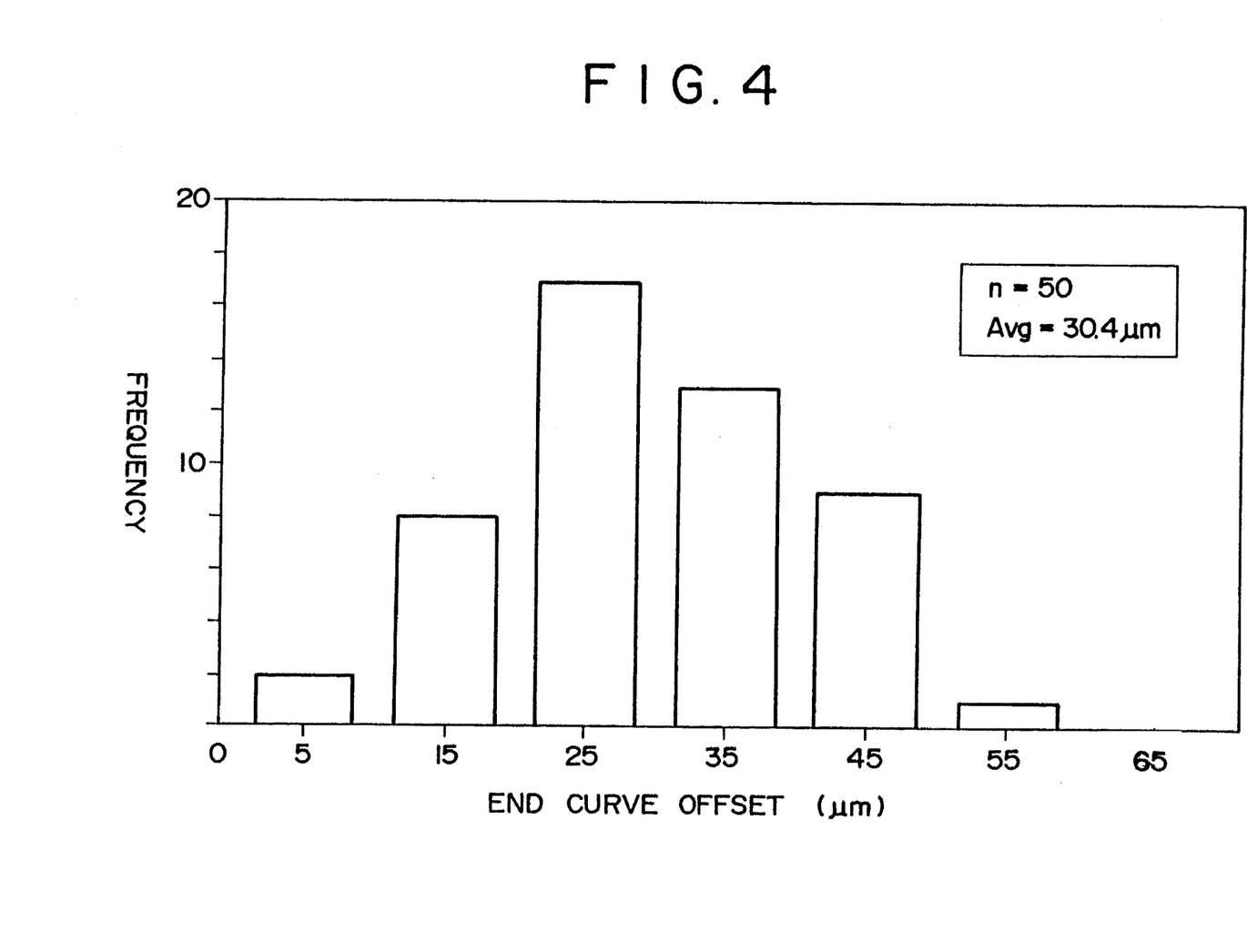
FIG. 4 is a graph showing the relation between frequency and end curve offset.

FIG. 4 is a graph showing a relationship between frequency and end curve offset, obtained with the above polishing apparatus according to the invention. As is seen from the Figure, the average end curve offset is 30.4 μm, which is within the permissible excentricity of the radius of curvature of 50 μm. Thus, it will be seen that the optical fiber connection loss is extremely reduced.

Figure 5:
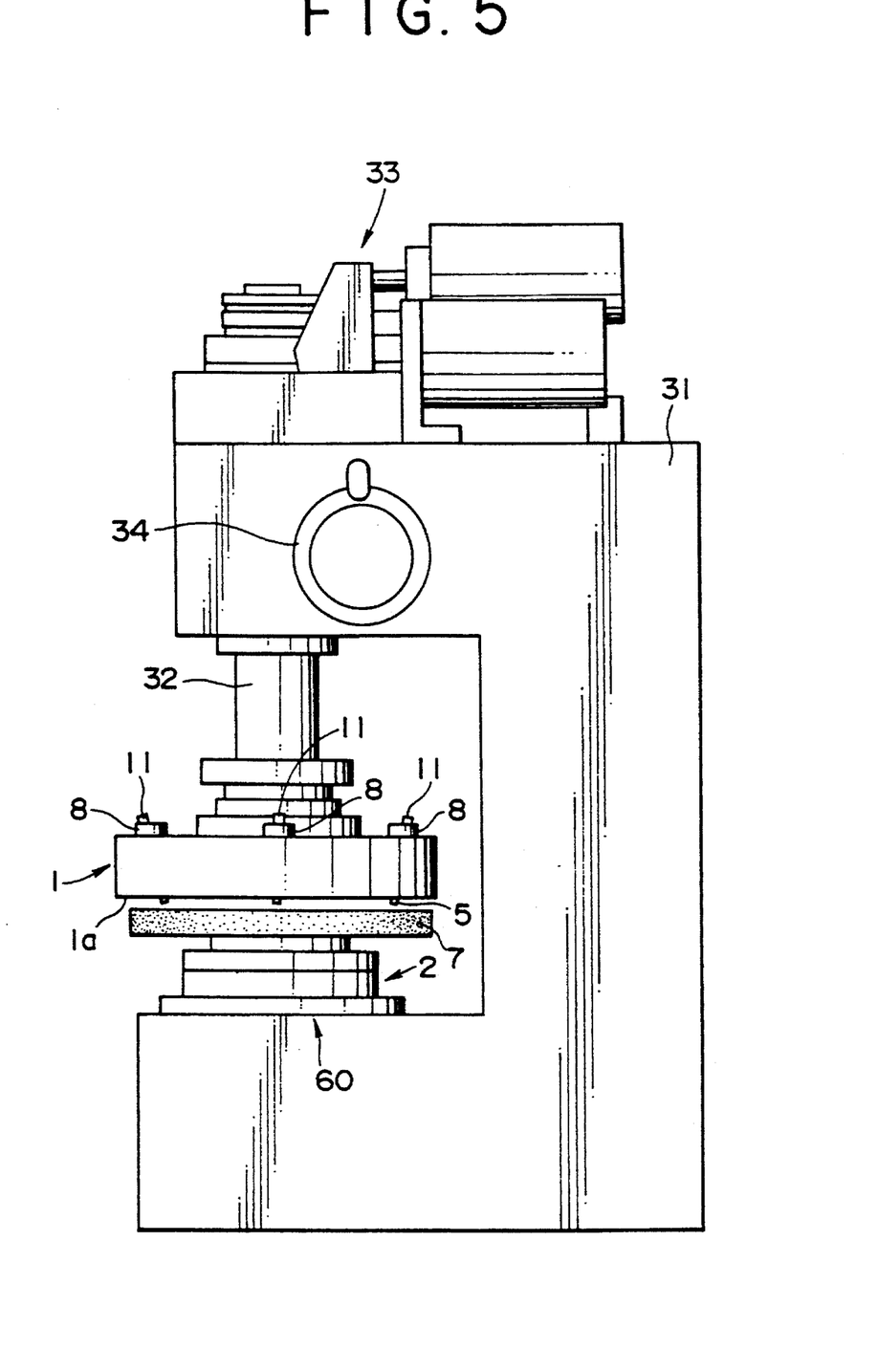
FIG. 5 is a schematic view showing the overall structure of the first embodiment of the optical connector end face polishing according to the invention.

Now, an example of the overall construction of optical connector end face polishing machine will be described, in which the optical connector support and polishing member sections 1 and 2 shown in FIG. 1 are assembled. This construction is assembled by using a base 31, which is called C type or column type and has excellent rigidity. The polishing machine comprises an optical connector support block 1, which has a plurality of rotary members 8 each for rotatably holding an optical connector. The optical connector support block 1 is substantially disk-like in shape and carries the plurality of rotary members 8 in a circumferential uniform interval arrangement. Holding member 11, as shown in FIG. 1, is assembled in each rotary member 8 for supporting and guiding the optical connector in such an attitude that the optical axis 12 is at a predetermined angle to the axis 10 of rotation. The end face 5 of the optical connector that is set in the holding member 11, projects from the bottom surface 1a of the optical connector support block 1. As noted before, the holding member 11 is capable of position adjustment by being advanced and retreated in the optical axis direction, and it is positioned such that the optical axis point on the optical connector end face 5 coincides with the axis 10 of rotation. The optical connector support block 1 includes an internal rotation drive mechanism for rotating the individual rotary members 8. Thus, the optical connector supported in the holding member 11 undergoes oscillating rotation about the axis 10 of rotation.

A main shaft 32 is inserted in an upper portion of the base 31. The optical connector support block 1 is detachably mounted on the lower end of the main shaft 32. The main shaft 32 comprises an outer quill and an inner shaft member coaxial therewith. The quill is vertically movable, while the shaft member is rotatable in both directions. Atop the base 31, a first drive system 33 coupled to the main shaft 32 is mounted. The first drive system 33 includes a feed mechanism, which can move the optical connector support block 1 in the axial direction via the quill of the main shaft 32, and a rotation mechanism, which can drive each rotary member 8 in the block 1 via the shaft member of the main shaft 32. The base 1 has a handle 34 mounted on its side wall for moving the main shaft 32 in the vertical direction when mounting and dismounting the optical connector support block 1.

Underneath the optical connector support block 1, a polishing block 2 comprising a polishing disk or grind wheel 7 is mounted on the base 31. The optical connector end face 5 which projects from the bottom surface 1a of the block 1, is held in contact with the polishing surface of the grind wheel 7 for desired inclined convex spherical surface polishing. A second drive system 60 provided inside the base 31 is coupled to the grind wheel 7 to drive the grind wheel 7 by rotational driving and also excentric driving, that is, cause rotation and revolution of the grind wheel 70.

As is seen from FIG. 5, in the polishing machine using the column type base, the main shaft 32 is supported such that it extends vertically, and also the first drive system 33, optical connector support block 1, and polishing block including the grind wheel 7 and second drive system 60 are all arranged in the vertical arrangement. Thus, loads applied to the optical connector support and polishing blocks 1 and 2 substantially consist of vertical components. The support structure is thus less subject to deformation. It is thus possible to hold the optical connector in the designed inclined attitude at all times to permit precise inclined convex spherical surface polishing. In addition, since all the components including the main shaft 32 and optical connector support block 1 are made of materials excellent in the mechanical strength, the overall structure has excellent rigidity. Thus, less errors are liable to result, the machining accuracy can be increased, and the excentricity of the radius of curvature of the convex spherical surface can be suppressed to be extremely small.

Figure 6:
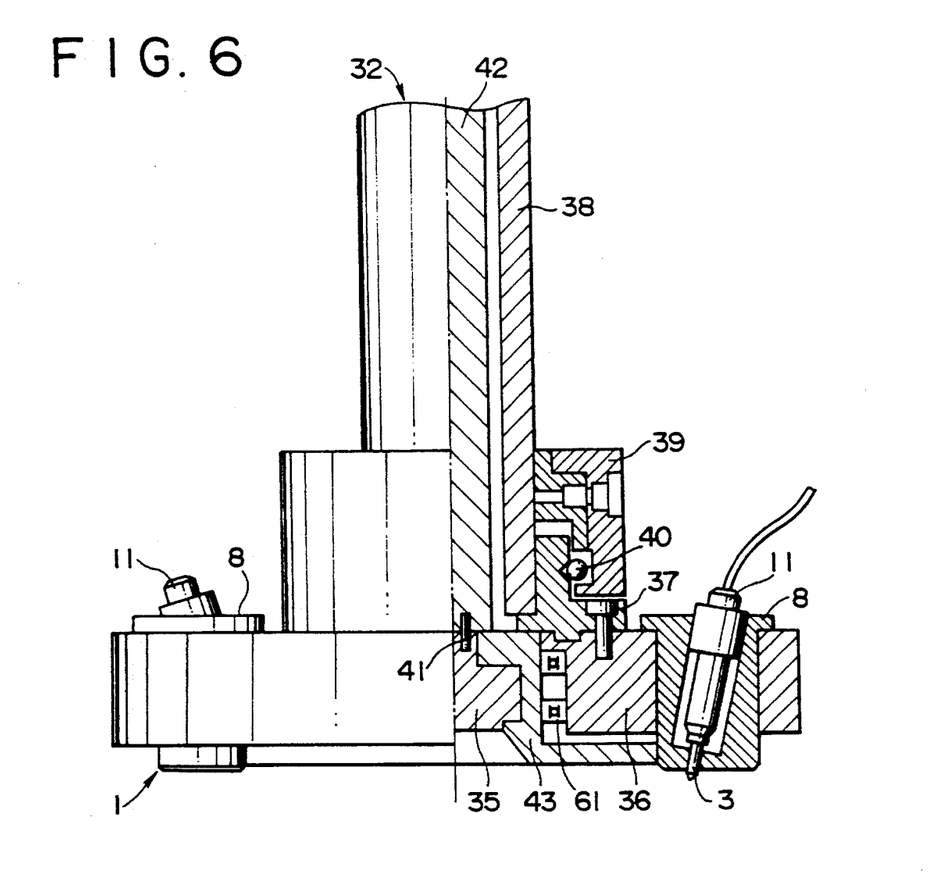
FIG. 6 is a side view, partly in section, showing an optical connector support block assembled in the optical connector end face polishing apparatus shown in FIG. 4.

FIG. 6 is a schematic view showing the detailed internal structure of the optical connector support block 1. The block 1 basically has a disk-like double-wall structure comprising an inner disk-like member 35 and an outer ring-like member 36, these members being made from thick metal materials. The inner and outer members 35 and 36 are coupled to each other via a bearing 61 for relative rotation. However, they are secured to each other in the thrust direction. A land member 37 is secured to the upper surface of the ring-like member 36. A cup 39 is mounted on a lower end portion of the quill 38 of the main shaft 32. The land member 37 is detachably inserted along the gap formed between the cup 39 and the outer periphery of the quill 38. The land member 37, quill 38 and cup 39 are secured to one another by a ball 40. The outer ring-like member 36 thus is secured to the quill 38 and is capable of being fed in the vertical direction. The inner disk-like member 35, on the other hand, is coupled by a pin 41 provided in its upper surface to the lower end surface of the shaft member 42 which is inserted in the quill 38. The inner disk-like member 35 thus is capable or rotation in unison with the shaft member 42 in both directions.

The plurality of rotary members 8, as noted above, are mounted in the secured outer ring-like member 36 along the circumference thereof. The rotary members 8 are each rotatably mounted via a bearing (not shown) in the outer ring-like member 36. The holding member 11 is assembled in each rotary member 8, and the optical connector 3 can be held in an inclined attitude in the holding member 11. The holding member 11 is capable of position adjustment by being advanced and retreated in the optical axis direction of the optical connector 3 as noted above. The outer periphery of a portion of the rotary member 8 that projects from the lower surface of the outer ring-like member 36 is frictionally coupled to the edge of a disk 43 which extends radially outward from the inner disk-like member 35. With this frictional rotation drive mechanism, rotation of the disk 43 in unison with the inner disk-like member 35 in both directions, causes reciprocal rotational driving of the rotary member 8. The rotary member 8 need not be driven by reciprocal rotational driving. Sometimes, it may be for being driven for rotation in a fixed direction.

Figure 9:
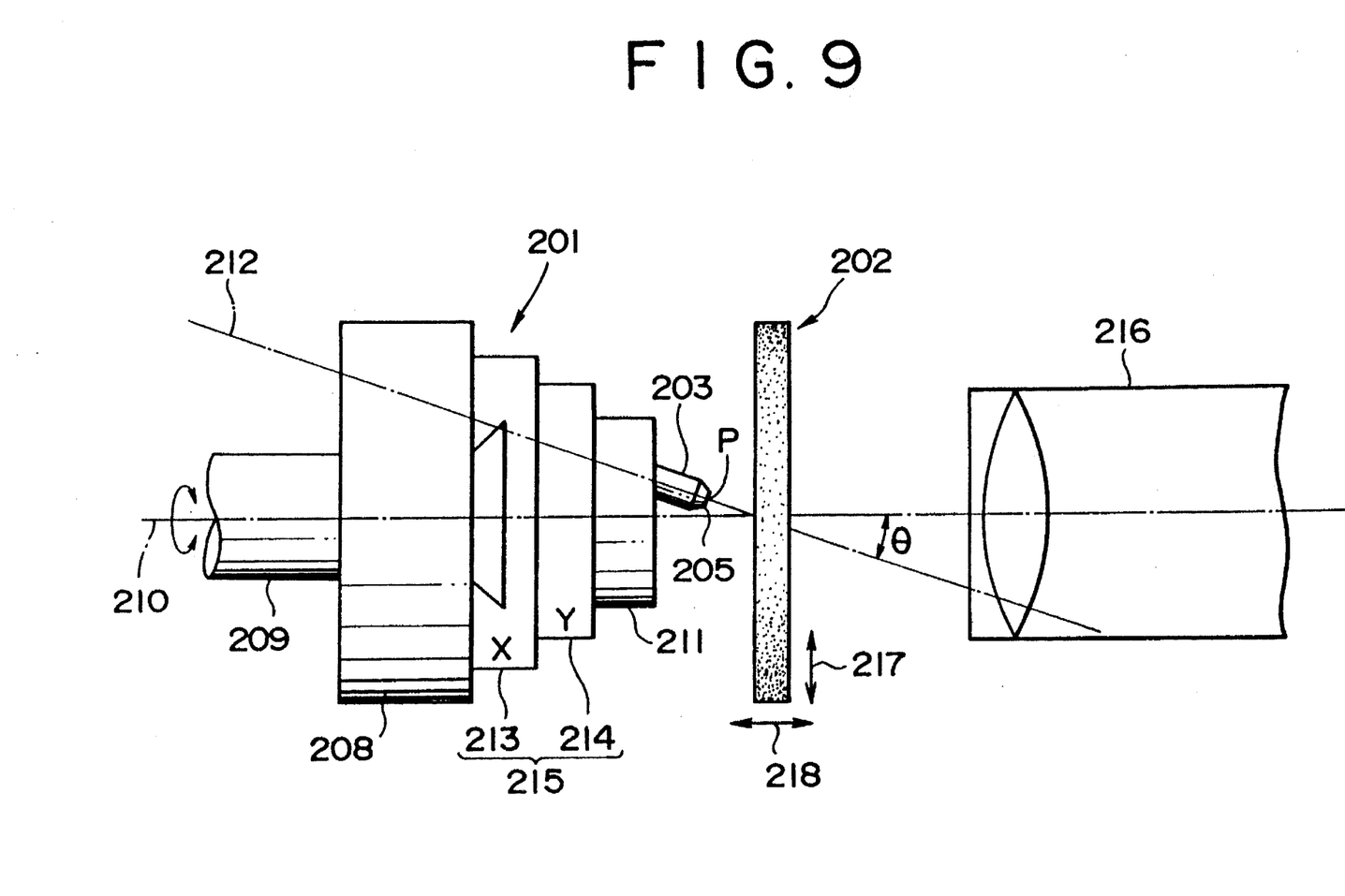
FIG. 9 is a schematic view showing a second embodiment of the optical connector end face polishing apparatus according to the invention.

FIG. 9 is a schematic view showing a second embodiment of the optical connector end face polishing apparatus according to the invention. This embodiment, unlike the preceding first embodiment, has a horizontal structure with a polishing member disposed vertically. This apparatus comprises an optical connector support section 201 for rotatably supporting an optical connector 203 and a polishing disk 202 to be in contact with the end face 205 of the optical connector 203 for inclined convex spherical surface polishing. The optical connector support section 201 includes a rotary member 208, which is driven by a shaft 209 for rotation about a horizontal axis 210 of rotation, and a holding member 211 mounted in the rotary member 208. The holding member 211 can hold the optical connector 203 such that the optical axis 212 of the optical connector 203 is at a predetermined angle θ to the axis 210 of rotation. An adjusting mechanism 215 is provided between the holding member 211 and rotary member 208. The optical connector 203 is secured in position in a state that the optical axis point P on the optical connector end face 205 coincides with the axis 210 of rotation. In this embodiment, the adjusting mechanism 215 has an X and a Y table 213 and 214. It can adjust the holding member 211 along a plane perpendicular to the axis 210 of rotation. That is, it can effect parallel movement adjustment of the optical connector 203 in a direction perpendicular to the axis 210 of rotation while holding the inclined attitude of the optical connector.

The operation of the apparatus shown in FIG. 9 will now be described. First, the optical connector 203 is set in the holding member 211, which is then mounted on the surface of the Y table 214. Then, the polishing disk 202 is retreated in a direction perpendicular to the axis 210 of rotation, and a microscope 216 is brought to a position such that it faces the holding member 211. At this time, the microscope 216 is set such that its optical axis coincides with the axis 210 of rotation. Then, the X and Y tables 213 and 214 are operated while observing the optical connector end face 205 with the microscope 216 for positioning the optical connector 203 such that the optical axis point P coincides with the axis 210 of rotation. Subsequently, the polishing disk 202 is brought in a direction 217 perpendicular to the axis 210 of rotation and moved in a direction 218 of the axis 210 of rotation so that it is brought into forced contact with the optical connector end face 205. At the same time, the rotary member 208 is driven by the shaft 209 for rotation to perform desired inclined convex spherical surface polishing.

As has been described in the foregoing, according to the invention the optical connector is set in the holding member such that its optical axis is at a predetermined angle to a predetermined axis of rotation, and then it is positioned by moving it until the optical axis point at its end face coincides with the axis of rotation. In this state, the optical connector is caused to undergo oscillating rotation about the axis of rotation while its inclined end face is held in forced contact with the polishing member for inclined convex spherical surface polishing. Thus, the apex of the inclined convex spherical surface and the optical axis point of the optical connector coincide with each other, and it is thus possible to suppress the excentricity of the radius of curvature of the convex spherical surface to an extremely small value. It is thus possible to realize reduction of reflected return light while maintaining very low insertion loss. The optical connector manufactured according to the invention thus is subject to low noise and suitably applicable to CATV or image transmission channel jumper cables.

What is claimed is:

1. A method of polishing an optical connector, wherein the optical connector has an optical axis extending to an end face of the optical connector, the method comprising the steps of:

causing the optical axis of an optical connector to be at a predetermined inclination angle to a predetermined axis of rotation to thereby incline said optical connector relative to said predetermined axis of rotation;

causing a point of said optical axis in the end face of said optical connector to coincide with said predetermined axis of rotation; and bringing said end face of said inclined optical connector into forced contact with a polishing member and maintaining said point of said optical axis in said end face of said optical connector in coincidence with said predetermined axis of rotation, while rotating said optical connector and said end face thereof about said predetermined axis of rotation.

2. The method according to claim 1, wherein an optical connector, of which said point of said optical axis is caused to coincide with said predetermined axis of rotation, is prepared in advance and is then set in a rotating holder of a polishing apparatus which includes said polishing member.

3. The method according to claim 1, further comprising rotating said polishing member relative to said end face of said optical connector while rotating said optical connector about said predetermined axis of rotation.

4. The method according to claim 1, wherein said step of causing the optical axis of the optical connector to be at a predetermined inclination angle comprises causing said optical axis of the optical connector to be at an angle of inclination of from 8° to 12° relative to said predetermined axis of rotation.

5. The method according to claim 1, further comprising:

mounting the optical connector in a holding member; and mounting the holding member in a rotary member which is rotatable about said predetermined axis of rotation, said holding member being mounted in said rotary member such that the optical axis of the optical connector is at said predetermined angle of inclination relative to said predetermined axis of rotation.

6. The method according to claim 5, wherein said step of causing a point of said optical axis in the end face of said optical connector to coincide with said predetermined axis of rotation comprises adjusting a relative position of said holding member in said rotary member.

7. The method according to claim 6, wherein said step of adjusting a relative position of said holding member in said rotary member comprises threadably inserting said holding member in said rotary member, and threadably adjusting said holding member in said rotary member in a direction of the optical axis of the optical connector.

8. The method according to claim 7, wherein said step of threadably adjusting said holding member in said rotary member comprises selectively advancing and retreating said holding member in said rotary member in said direction of said optical axis.

* * * * *